(12) United States Patent
Jurek

(10) Patent No.: US 12,233,682 B2
(45) Date of Patent: Feb. 25, 2025

(54) HEATING, VENTILATION AND AIR CONDITIONING SYSTEM WITH ILLUMINATION

(71) Applicant: Dometic Sweden AB, Solna (SE)

(72) Inventor: Todd Jurek, Elkhart, IN (US)

(73) Assignee: Dometic Sweden AB, Solna (SE)

( * ) Notice: Subject to any disclaimer, the term of this patent is extended or adjusted under 35 U.S.C. 154(b) by 877 days.

(21) Appl. No.: 17/252,506

(22) PCT Filed: Jun. 17, 2019

(86) PCT No.: PCT/IB2019/055060
§ 371 (c)(1),
(2) Date: Dec. 15, 2020

(87) PCT Pub. No.: WO2019/244011
PCT Pub. Date: Dec. 26, 2019

(65) Prior Publication Data
US 2021/0276396 A1    Sep. 9, 2021

Related U.S. Application Data

(60) Provisional application No. 62/686,217, filed on Jun. 18, 2018.

(51) Int. Cl.
*B60H 1/00* (2006.01)
*F24F 13/078* (2006.01)

(52) U.S. Cl.
CPC ..... *B60H 1/00364* (2013.01); *B60H 1/00207* (2013.01); *F24F 13/078* (2013.01); *B60H 2001/00235* (2013.01); *F24F 2221/02* (2013.01)

(58) Field of Classification Search
CPC ...... B60H 1/00364; B60H 2001/00235; B60H 1/00207; F24F 2221/02; F24F 13/078
See application file for complete search history.

(56) References Cited

U.S. PATENT DOCUMENTS

| D226,381 S | 2/1973 | Harty, Jr. |
|---|---|---|
| 4,051,691 A | 10/1977 | Dawkins |
| (Continued) | | |

FOREIGN PATENT DOCUMENTS

| AU | 2004202967 | 3/2011 |
|---|---|---|
| AU | 2007200788 | 9/2011 |
| (Continued) | | |

OTHER PUBLICATIONS

Design U.S. Appl. No. 29/715,592, filed Dec. 3, 2019 titled Filter Housing.

(Continued)

*Primary Examiner* — Steven S Anderson, II
(74) *Attorney, Agent, or Firm* — Dinsmore & Shohl LLP

(57) ABSTRACT

Present embodiments relate to a heating, ventilation, air conditioning ("HVAC") system which is used in both fixed and mobile structures, and which has a luminaire disposed in the HVAC to provide illumination therefrom. The luminaire may be a single continuously on light or it may be a flashing light with one or more patterns. The light may emit a single color or multiple colors. The light may also have a flashing sequence which corresponds to audio. The light may be wired to a switch and/or may be controlled by a smart device in wireless communication with the HVAC system.

21 Claims, 8 Drawing Sheets

(56) References Cited

U.S. PATENT DOCUMENTS

| | | | |
|---|---|---|---|
| 4,366,530 A * | 12/1982 | Milhous | B60H 1/26 362/543 |
| 4,513,809 A | 4/1985 | Schneider et al. | |
| D284,025 S | 5/1986 | Armstrong | |
| 4,641,502 A | 2/1987 | Aldrich | |
| 4,672,818 A | 6/1987 | Roth | |
| 4,709,623 A | 12/1987 | Roth | |
| D300,777 S | 4/1989 | Bales | |
| 4,825,936 A | 5/1989 | Hoagland et al. | |
| D306,341 S | 2/1990 | Bales | |
| 5,205,130 A | 4/1993 | Pannell | |
| 5,423,187 A | 6/1995 | Fournier | |
| 5,531,641 A | 7/1996 | Aldrich | |
| 5,848,536 A | 12/1998 | Dodge | |
| 6,213,197 B1 | 4/2001 | Ebbeson | |
| 6,263,689 B1 | 7/2001 | Dodge | |
| 6,339,934 B1 | 1/2002 | Yoon et al. | |
| 6,357,249 B1 * | 3/2002 | Robinson | F24F 1/022 62/244 |
| 6,449,973 B2 | 9/2002 | Dodge | |
| D469,173 S | 1/2003 | Kawanori et al. | |
| 6,595,499 B2 | 7/2003 | Colussi et al. | |
| D495,041 S | 8/2004 | Thomas | |
| 6,857,953 B2 | 2/2005 | Malott | |
| 7,140,192 B2 | 11/2006 | Allen | |
| 7,171,822 B2 | 2/2007 | Allen | |
| D538,413 S | 3/2007 | Lyu et al. | |
| 7,234,315 B2 | 6/2007 | Allen | |
| 7,237,397 B2 | 7/2007 | Allen | |
| 7,316,119 B2 | 1/2008 | Allen | |
| D565,712 S | 4/2008 | Nagahori et al. | |
| 7,404,297 B2 | 7/2008 | Chen | |
| 7,419,368 B2 | 9/2008 | Milks | |
| D588,479 S | 3/2009 | Giese | |
| D591,410 S | 4/2009 | Kashimoto | |
| 7,739,882 B2 | 6/2010 | Evans | |
| D621,492 S | 8/2010 | Tanaka et al. | |
| D627,043 S | 11/2010 | Tanaka et al. | |
| 7,963,117 B2 | 6/2011 | Allen | |
| 8,056,351 B2 | 11/2011 | Marciano | |
| D661,386 S | 6/2012 | Bergin | |
| D662,472 S | 6/2012 | Tien | |
| 8,240,168 B2 | 8/2012 | Holguin | |
| 8,347,950 B2 | 1/2013 | Stroobants | |
| D680,635 S | 4/2013 | Kashimoto et al. | |
| 8,416,101 B2 | 4/2013 | Jang | |
| 8,440,143 B2 | 5/2013 | Liptak | |
| 8,535,127 B2 | 9/2013 | Malott | |
| 8,568,209 B2 | 10/2013 | Boxum | |
| D705,917 S | 5/2014 | Hagiwara | |
| D708,850 S | 7/2014 | Morine et al. | |
| D712,531 S | 9/2014 | Bergin | |
| D715,907 S | 10/2014 | Bergin | |
| D716,925 S | 11/2014 | Bergin | |
| D724,715 S | 3/2015 | Isshiki | |
| D755,944 S | 5/2016 | Daniels | |
| D759,223 S | 6/2016 | Kosuge | |
| D762,528 S | 8/2016 | Allard et al. | |
| 9,476,608 B2 | 10/2016 | Yang et al. | |
| D770,787 S | 11/2016 | Kim et al. | |
| D773,023 S | 11/2016 | Nishiguchi et al. | |
| D773,024 S | 11/2016 | Nishiguchi et al. | |
| D773,025 S | 11/2016 | Nishiguchi et al. | |
| D773,625 S | 12/2016 | Nishiguchi et al. | |
| 9,618,260 B2 | 4/2017 | Kang | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin | |
| D796,018 S | 8/2017 | Kusuki | |
| 9,757,674 B2 | 9/2017 | Kwon | |
| D810,251 S | 2/2018 | Yamashita | |
| D811,566 S | 2/2018 | Liu | |
| D817,466 S | 5/2018 | Moseley | |
| 9,975,405 B2 | 5/2018 | Siddiqui | |
| D822,806 S | 7/2018 | Niki | |
| D822,807 S | 7/2018 | Niki | |
| D822,808 S | 7/2018 | Niki | |
| D822,809 S | 7/2018 | Niki | |
| D822,810 S | 7/2018 | Niki | |
| D822,811 S | 7/2018 | Niki | |
| D824,499 S | 7/2018 | Williamson | |
| D822,190 S | 8/2018 | Isshiki | |
| D827,116 S | 8/2018 | Isshiki | |
| 10,082,345 B1 | 9/2018 | Mihail | |
| D830,526 S | 10/2018 | Niki | |
| D830,527 S | 10/2018 | Niki | |
| 10,093,152 B2 | 10/2018 | Allard | |
| D832,987 S | 11/2018 | Bergin | |
| D838,629 S | 1/2019 | Hinsey et al. | |
| D839,139 S | 1/2019 | Hinsey et al. | |
| D841,138 S | 2/2019 | Williamson | |
| D841,139 S | 2/2019 | Bergin | |
| D846,717 S | 4/2019 | Niki | |
| D846,718 S | 4/2019 | Niki | |
| D846,720 S | 4/2019 | Niki | |
| D849,217 S | 5/2019 | Yamashita | |
| D850,609 S | 6/2019 | Bergin | |
| D862,668 S | 10/2019 | Moseley | |
| D865,926 S | 11/2019 | Moseley | |
| D879,928 S | 3/2020 | Fujioka et al. | |
| 10,589,593 B2 | 3/2020 | Westendarp | |
| D882,054 S | 4/2020 | Shiota | |
| D883,459 S | 5/2020 | Ishihama et al. | |
| D884,870 S | 5/2020 | Bergin | |
| 10,675,941 B2 | 6/2020 | Williamson | |
| 10,696,129 B2 | 6/2020 | Bergin | |
| D905,217 S | 8/2020 | Hederstiema | |
| D902,365 S | 11/2020 | Niki | |
| D907,183 S | 1/2021 | Meda | |
| 10,941,955 B2 | 3/2021 | Heral | |
| D915,569 S | 4/2021 | Meda | |
| D917,036 S | 4/2021 | Hederstierna | |
| 11,027,595 B2 | 6/2021 | Smith et al. | |
| 11,034,208 B2 | 6/2021 | Williamson | |
| D940,287 S | 1/2022 | Fidler | |
| D940,289 S | 1/2022 | Hederstierna | |
| D944,374 S | 2/2022 | Hederstierna et al. | |
| 11,511,603 B2 | 11/2022 | Bilston et al. | |
| D980,410 S | 3/2023 | Kim et al. | |
| 11,752,827 B2 | 9/2023 | Meda et al. | |
| D1,010,080 S | 1/2024 | Hederstierna et al. | |
| 2004/0040325 A1 | 3/2004 | Evans | |
| 2005/0163669 A1 | 7/2005 | Parker | |
| 2006/0016213 A1 * | 1/2006 | Al Rashidi | B60N 3/16 62/239 |
| 2006/0018807 A1 | 1/2006 | Taylor | |
| 2006/0052050 A1 | 3/2006 | Malott | |
| 2007/0227693 A1 | 10/2007 | Allen | |
| 2008/0202138 A1 | 8/2008 | Pabisz | |
| 2009/0209193 A1 | 8/2009 | Kloster | |
| 2011/0253847 A1 | 10/2011 | Kataoka et al. | |
| 2012/0127050 A1 | 5/2012 | Song et al. | |
| 2013/0120972 A1 | 5/2013 | Chung | |
| 2013/0205811 A1 | 8/2013 | Esch | |
| 2014/0223928 A1 | 8/2014 | Esch | |
| 2014/0260393 A1 * | 9/2014 | Siddiqui | B60H 1/00364 62/410 |
| 2017/0079119 A1 * | 3/2017 | Horist | G10H 1/0066 |
| 2017/0097162 A1 | 4/2017 | Seo | |
| 2017/0307242 A1 | 10/2017 | Handsaker et al. | |
| 2018/0147913 A1 | 5/2018 | Bergin | |
| 2018/0328618 A1 | 11/2018 | Palmer | |
| 2019/0047353 A1 | 2/2019 | Williamson | |
| 2019/0047354 A1 | 2/2019 | Williamson | |
| 2019/0128551 A1 | 5/2019 | Heral | |
| 2019/0315197 A1 | 10/2019 | Williamson | |
| 2020/0148028 A1 | 5/2020 | Westendarp | |
| 2020/0198438 A1 | 6/2020 | Liu | |
| 2020/0298655 A1 | 9/2020 | Williamson | |
| 2020/0338951 A1 | 10/2020 | Paci | |
| 2021/0061054 A1 | 3/2021 | Meda | |
| 2021/0061058 A1 | 3/2021 | Meda | |

(56) References Cited

U.S. PATENT DOCUMENTS

| | | | |
|---|---|---|---|
| 2021/0061060 | A1 | 3/2021 | Meda |
| 2021/0207882 | A1 | 7/2021 | Jurek |
| 2021/0239105 | A1 | 8/2021 | Allard |
| 2021/0276396 | A1 | 9/2021 | Jurek |
| 2021/0354526 | A1 | 11/2021 | Williamson |
| 2022/0332170 | A1 | 10/2022 | Williamson et al. |
| 2023/0104268 | A1 | 4/2023 | Do et al. |
| 2023/0111297 | A1 | 4/2023 | Hwang et al. |
| 2023/0347707 | A1 | 11/2023 | Meda et al. |
| 2023/0398830 | A1 | 12/2023 | Eichorst et al. |

FOREIGN PATENT DOCUMENTS

| | | |
|---|---|---|
| AU | 2007237183 | 12/2012 |
| AU | 2009233601 | 1/2013 |
| AU | 2007202766 | 11/2013 |
| AU | 354553 | 3/2014 |
| AU | 2012261549 | 8/2015 |
| AU | 367405 | 3/2016 |
| AU | 201612249 | 3/2016 |
| AU | 201613590 | 7/2016 |
| AU | 201613591 | 7/2016 |
| AU | 201613592 | 7/2016 |
| AU | 201613593 | 7/2016 |
| AU | 2016101949 | 12/2016 |
| AU | 2017100215 | 3/2017 |
| AU | 201712794 | 5/2017 |
| AU | 201712798 | 5/2017 |
| AU | 2017200186 | 8/2017 |
| AU | 201810968 | 3/2018 |
| AU | 201810969 | 3/2018 |
| AU | 201810970 | 3/2018 |
| AU | 201810971 | 3/2018 |
| AU | 201810972 | 3/2018 |
| AU | 201810973 | 3/2018 |
| AU | 201810975 | 3/2018 |
| AU | 201810977 | 3/2018 |
| AU | 201810978 | 3/2018 |
| AU | 201816419 | 1/2019 |
| AU | 201910037 | 2/2019 |
| AU | 201910038 | 2/2019 |
| AU | 201911094 | 4/2019 |
| AU | 201912125 | 6/2019 |
| AU | 2017364256 | 6/2019 |
| AU | 2019202512 | 10/2019 |
| AU | 201915241 | 12/2019 |
| AU | 201916406 | 12/2019 |
| AU | 201916408 | 12/2019 |
| AU | 201916409 | 12/2019 |
| AU | 2018366469 | 5/2020 |
| AU | 202016120 | 1/2021 |
| AU | 202016121 | 1/2021 |
| AU | 202016122 | 1/2021 |
| AU | 202016123 | 1/2021 |
| CA | 2518348 | 3/2006 |
| CA | 2578651 | 8/2007 |
| CA | 2587994 | 12/2007 |
| CA | 2611822 | 5/2008 |
| CA | 2686403 | 5/2010 |
| CA | 2906348 | 9/2014 |
| CA | 2951956 | 12/2015 |
| CA | 2954152 | 1/2016 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CN | 1517608 A | 8/2004 |
| CN | 1816459 A | 8/2006 |
| CN | 101943449 A | 1/2011 |
| CN | 102265096 A | 11/2011 |
| CN | 202546945 | 11/2012 |
| CN | 103237671 A | 8/2013 |
| CN | 103687735 A | 3/2014 |
| CN | 204693661 U | 10/2015 |
| CN | 106470856 A | 3/2017 |
| CN | 304097003 S | 4/2017 |
| CN | 106976376 A | 7/2017 |
| CN | 206493894 U | 9/2017 |
| CN | 108790676 A | 11/2018 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110126588 A | 8/2019 |
| CN | 110217073 A | 9/2019 |
| CN | 110293813 A | 10/2019 |
| CN | 110385958 A | 10/2019 |
| CN | 305397384 S | 10/2019 |
| CN | 111344168 A | 6/2020 |
| CN | 213237518 | 5/2021 |
| CN | 213237945 | 5/2021 |
| CN | 306672354 S | 7/2021 |
| CN | 306681352 S | 7/2021 |
| CN | 306901266 S | 10/2021 |
| DE | 1472379 A1 | 12/1968 |
| DE | 19654261 | 6/1998 |
| DE | 69503723 | 9/1998 |
| DE | 19730136 | 1/1999 |
| DE | 10012157 C1 | 6/2001 |
| DE | 69817899 | 10/2003 |
| DE | 20313136 U1 | 11/2003 |
| DE | 10255833 | 6/2004 |
| DE | 10336767 | 12/2004 |
| DE | 59812376 | 1/2005 |
| DE | 202004007924 | 11/2005 |
| DE | 202005013530 | 12/2005 |
| DE | 102004032920 A1 | 3/2006 |
| DE | 202004017266 | 4/2006 |
| DE | 202005000560 | 6/2006 |
| DE | 102005030362 | 11/2006 |
| DE | 602004004480 | 3/2007 |
| DE | 202007003764 U1 | 5/2007 |
| DE | 202006001374 | 7/2007 |
| DE | 202006001376 | 7/2007 |
| DE | 202006001377 | 7/2007 |
| DE | 202006009803 | 12/2007 |
| DE | 202007006292 | 10/2008 |
| DE | 102007038716 | 2/2009 |
| DE | 102007038716 A1 | 2/2009 |
| DE | 602005012194 | 2/2009 |
| DE | 202008003123 | 9/2009 |
| DE | 102008028066 | 12/2009 |
| DE | 602007009584 | 11/2010 |
| DE | 502007006725 | 4/2011 |
| DE | 202011101256 | 12/2011 |
| DE | 202010012578 | 2/2012 |
| DE | 202011002986 | 7/2014 |
| DE | 202013004158 | 9/2014 |
| DE | 102014200623 A1 | 7/2015 |
| DE | 102017116909 A1 | 2/2018 |
| DE | 102016220768 | 4/2018 |
| DE | 112016004234 T5 | 6/2018 |
| DE | 112017000915 | 10/2018 |
| DE | 102017214941 | 2/2019 |
| DE | 102017207797 | 8/2019 |
| DE | 112017005541 | 8/2019 |
| DE | 102018204532 | 9/2019 |
| DE | 102018206490 | 10/2019 |
| DE | 102019205194 | 10/2019 |
| DE | 102017219353 | 11/2019 |
| DE | 102018206854 | 11/2019 |
| DE | 112018003284 | 3/2020 |
| DE | 202015009786 | 3/2020 |
| DE | 212018000248 | 3/2020 |
| DE | 212018000249 | 3/2020 |
| DE | 112018003288 | 4/2020 |
| DE | 102018222877 | 6/2020 |
| DE | 102018222877 A1 | 6/2020 |
| DE | 112018005002 | 7/2020 |
| DE | 112018005883 | 7/2020 |
| DE | 102019212949 A1 | 3/2021 |

(56) References Cited

FOREIGN PATENT DOCUMENTS

| | | |
|---|---|---|
| DE | 102020203424 | 7/2021 |
| DE | 112020000265 | 9/2021 |
| DE | 102021208289 A1 | 2/2023 |
| EP | 0115674 | 8/1984 |
| EP | 700801 | 3/1996 |
| EP | 869018 | 10/1998 |
| EP | 892225 | 1/1999 |
| EP | 1527919 A1 | 5/2005 |
| EP | 1538009 | 6/2005 |
| EP | 1634740 | 3/2006 |
| EP | 1721765 | 11/2006 |
| EP | 1752717 | 2/2007 |
| EP | 1826041 | 8/2007 |
| EP | 1870270 | 12/2007 |
| EP | 1925889 | 5/2008 |
| EP | 1955946 | 8/2008 |
| EP | 1988612 | 11/2008 |
| EP | 2189312 | 5/2010 |
| EP | 2192040 | 6/2010 |
| EP | 2196390 | 6/2010 |
| EP | 2397787 A2 | 12/2011 |
| EP | 2433658 | 3/2012 |
| EP | 2665611 | 10/2014 |
| EP | 2921792 A1 | 9/2015 |
| EP | 2178710 | 11/2015 |
| EP | 2616258 | 2/2016 |
| EP | 3113965 | 1/2017 |
| EP | 3193096 A1 | 7/2017 |
| EP | 3241695 | 4/2018 |
| EP | 2714440 | 5/2018 |
| EP | 2994326 | 7/2018 |
| EP | 3401619 | 11/2018 |
| EP | 3411250 | 12/2018 |
| EP | 3476630 | 5/2019 |
| EP | 3543047 | 9/2019 |
| EP | 3564564 | 11/2019 |
| EP | 3677459 A1 | 7/2020 |
| EP | 3592585 | 7/2021 |
| EP | 4147892 A1 | 3/2023 |
| JP | 201796577 A | 6/2017 |
| JP | 2020199805 A | 12/2020 |
| KR | 20100092070 A | 8/2010 |
| KR | 101445551 B1 | 9/2014 |
| RU | 2753994 C2 | 8/2021 |
| WO | 2004108448 A1 | 12/2004 |
| WO | 2007042065 A1 | 4/2007 |
| WO | 2009021994 A1 | 2/2009 |
| WO | 2009055891 A1 | 5/2009 |
| WO | 2009087094 | 7/2009 |
| WO | 2012034695 A1 | 3/2012 |
| WO | 2012113538 A1 | 8/2012 |
| WO | 2012159749 A1 | 11/2012 |
| WO | 2013082692 A1 | 6/2013 |
| WO | 2014097805 A1 | 6/2014 |
| WO | 2014143181 A1 | 9/2014 |
| WO | 2014180559 A1 | 11/2014 |
| WO | 2016203542 A1 | 12/2016 |
| WO | 2017143393 A1 | 8/2017 |
| WO | 2017143394 A1 | 8/2017 |
| WO | 2017149752 A1 | 9/2017 |
| WO | 2018096127 A1 | 5/2018 |
| WO | 2018162016 A1 | 9/2018 |
| WO | 2019038023 A1 | 2/2019 |
| WO | 2019082168 A1 | 5/2019 |
| WO | 2019097448 A1 | 5/2019 |
| WO | 2019207451 A2 | 10/2019 |
| WO | 2019229706 A1 | 12/2019 |
| WO | 2019244011 | 12/2019 |
| WO | 2019244011 A1 | 12/2019 |
| WO | 2020143636 A1 | 7/2020 |
| WO | 2020151541 A1 | 7/2020 |
| WO | 2020188485 A2 | 9/2020 |
| WO | 2020192746 A1 | 10/2020 |
| WO | 2021074841 | 4/2021 |
| WO | 20210186414 | 9/2021 |

OTHER PUBLICATIONS

Design U.S. Appl. No. 29/758,314, filed Nov. 13, 2020 titled Air Conditioning Apparatus.
Dometic Product Catalog—Climate Control. 2015.
Dometic Product Catalog—Climate Control. 2016.
Office Action Issued in Chinese Application No. 202230072879.6 mailed on Aug. 8, 2023.
10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014, https://web.archive.org/web/20140323013456/ http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140, Feb. 23, 2013.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine Off; http://www.eberspacher.com/products/air-conditioning/cooltronic-truck-parking-coolers.html Jun. 23, 2015.
Indelb; WO Oblo; Sleeping Well Oblo; http://www.indelb.com/products/parking_air_cooler/sleeping_well/sw_oblo Apr. 1, 2016.
Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/.
Webasto; Truck parking cooler: Cool Top Vario 10 E; http://www.webasto.com/gb/marketsproducts/truck/air-conditioning/products/cool-top-vario/ Apr. 25, 2016.
Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591).
Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Design U.S. Appl. No. 29/760,605, filed Dec. 2, 2020.
U.S. Appl. No. 63/141,800, filed Jan. 26, 2021 titled Air Conditioning System for a Vehicle.
Design U.S. Appl. No. 29/767,929, filed Jan. 26, 2021 titled Air Conditioner Housing.

(56) References Cited

OTHER PUBLICATIONS

Design U.S. Appl. No. 29/774,535, filed Mar. 17, 2021 titled Air Distribution Box.
U.S. Appl. No. 63/175,304, filed Apr. 1, 2021.
U.S. Appl. No. 62/819,711, filed Mar. 18, 2019 titled Mobile Air Conditioner.
"Dometic Freshjet Rooftop Conditioner", Available from Internet, URL: https://www.amazon.com/Dometic-FreshJet-Rooftop-Conditioner-13-5K/dp/B0BGYWF8XS, 2022.
Restriction Requirement issued in U.S. Appl. No. 29/826,755 mailed on May 11, 2023.
Office Action Issued in Chinese Application No. 201980040452.3 mailed on May 20, 2023.
Office Action Issued in Chinese Application No. 202230072879.6 mailed on Jun. 5, 2023.
Office Action Issued in Chinese Application No. 202230073218.5 mailed on Jun. 8, 2023.
Office Action Issued in Chinese Application No. 202230073233.X mailed on Jun. 28, 2023.
Notice of Allowability issued in U.S. Appl. No. 29/758,314 mailed on Jul. 17, 2023.
Office Action Issued in Chinese Application No. 202230072942.6 mailed on Jul. 28, 2023.
Corrected Notice of Allowability issued in U.S. Appl. No. 29/758,314 mailed on Aug. 18, 2023.
Climate Control IBIS4-IB36H401R1, 1B36H401RIY Air conditioning roof unit Installation Manual, https://epi.dometic.com/externalassets/ibis4-roof-top-adb_9600009482_73658.pdf?ref=2016056866, published on Feb. 20, 2020.
Climate Control—FJX—Dometic FreshJet FJX Short Operating Manual EMEA16, https://manuals.plus/dometic/fix-series-fjx4233m-roof-air-conditioner-manual#axzz7gOSILhRB, Jul. 22, 2022.
Dometic FreshJet FJX4233M, FJX4233M, FJX4233EEH, FJX4333E(EH), FJX7333IHP, FJX7337IHP, FJX7457IHP—Dometic Documents Release Dates, https://documents.dometic.com/search/arabic?query=, Jun. 29, 2022.
RecPro RV Air Conditioner 15K Non-Ducted I With Heat Pump for Heating or Cooling Option I RV AC Unit 1 Camper Air Conditioner (Black), https://www.amazon.com/dp/B089MH5WCM/ref=syn_sd_onsite_desktop_41?pd_rd_plhdr=t&th=1, Jun. 4, 2020.
PCT Application No. PCT/CN2022/109994 titled "Fresh air intake in AC" filed on Aug. 3, 2022.
PCT Application No. PCT/EP2022/067107 titled "Ventilation Unit and Recreational Vehicle With a Ventilation Unit" filed on Jun. 23, 2022.
Australia Patent Application No. 2021272652 titled "Air conditioning unit" filed on Sep. 27, 2022.
Restriction Requirement issued in U.S. Appl. No. 29/758,314 mailed on Oct. 11, 2022.
Australia Patent Application No. 2021272270 titled "Air conditioning unit" filed on Sep. 27, 2022.
International Search Report and Written Opinion issued in PCT Application No. PCT/EP2022/067107 mailed on Oct. 13, 2022.
International Search Report and Written Opinion issued in PCT Application No. PCT/CN2022/109994 mailed on Nov. 8, 2022.
U.S. Appl. No. 17/998,616 titled "Air Conditioning Unit" filed Nov. 11, 2022.
U.S. Appl. No. 17/998,620 titled "Air Conditioning Unit" filed Nov. 11, 2022.
U.S. Appl. No. 17/998,623 titled "Air Conditioning Unit" filed Nov. 11, 2022.
Chinese Patent Application No. 202180034145.1 titled "Air Conditioning Unit" filed on Nov. 9, 2022.
Chinese Patent Application No. 2021800341470 titled "Air Conditioning Unit" filed on Nov. 9, 2022.
Chinese Patent Application No. 202180034825.3 titled "Air Conditioning Unit" filed on Nov. 11, 2022.
DE Patent Application No. 102023200650.2 entitled "Ventilating Unit and Recreational Vehicle with a Ventilation Unit" filed on Jan. 26, 2023.
Non-Final issued in U.S. Appl. No. 29/758,314 mailed on Feb. 27, 2023.
German Patent Application 102020206181.5 entitled "Shape X—Antenna" filed on May 15, 2020.
German Patent Application 102020206182.3 entitled "Shape X—Connection Hub" filed on May 15, 2020.
German Patent Application 102020206183.1 entitled "Shape X—Upgrade Kit" filed on May 15, 2020.
U.S. Appl. No. 62/992,595 entitled "Heating, Ventilation and Air Conditioning System with Illumination" filed Mar. 20, 2020.
U.S. Appl. No. 62/686,217 entitled "Heating, Ventilation and Air Conditioning System with Illumination" filed Jun. 18, 2018.
U.S. Appl. No. 29/758,314 entitled "Air Conditioning Apparatus" filed Nov. 13, 2020.
European Union Patent Application 007942891-0001-0004 entitled "Shape X" filed on May 15, 2020.
Australian Patent Application 202016120 entitled "Shape X" filed on Nov. 11, 2020.
Australian Patent Application 202016121 entitled "Shape X" filed on Nov. 11, 2020.
Australian Patent Application 202016122 entitled "Shape X" filed on Nov. 11, 2020.
Australian Patent Application 202016123 entitled "Shape X" filed on Nov. 11, 2020.
Chinese Patent Application 202030660183.6 entitled "Shape X" filed on Nov. 3, 2020.
Chinese Patent Application 202030659749.3 entitled "Shape X" filed on Nov. 3, 2020.
Chinese Patent Application 201980040452.3 entitled "Heating, Ventilation and Air Conditioning System with Illumination" filed Jun. 17, 2019.
Australian Patent Application 2019291452 entitled "Heating, ventilation and air conditioning system with illumination" filed on Jun. 17, 2019.
European Patent Application 19759430.2 entitled "Heating, Ventilation and Air Conditioning System with Illumination" filed on Jun. 17, 2019.
International Preliminary Report on Patentability issued for PCT/IB2019/055060 dated Dec. 22, 2020.
Notification of Registration for European Union Patent Application No. 007942891-0001-0004 mailed on May 21, 2020.
Notification to Grant for Chinese Patent Application No. 202030659749.3 mailed on Apr. 12, 2021.
Notification to Grant for Chinese Patent Application No. 202030660183.6 mailed on Apr. 13, 2021.
Office Action Issued in China Patent Application No. 202030660183.6 mailed on Feb. 23, 2021.
Office Action Issued in China Patent Application No. 202030659749.3 mailed on Feb. 23, 2021.
PCT Application No. PCT/IB2021/052330 entitled "Heating, Ventilation and Air Conditioning System with Illumination" filed on Mar. 19, 2021.
U.S. Appl. No. 17/205,719 entitled "Heating, Ventilation and Air Conditioning System with Illumination" filed Mar. 18, 2021.
PCT Application No. PCT/EP2021/061578 entitled "Shape X—Upgrade Kit" filed on May 3, 2021.
PCT Application No. PCT/EP2021/061678 entitled "Shape X—Connection Hub" filed on May 4, 2021.
PCT Application No. PCT/EP2021/061568 entitled "Shape X—Antenna" filed on May 3, 2021.
International Search Report and Written Opinion Issued for Application No. PCT/IB2021/052330 mailed on Jun. 23, 2021.
China Patent Application No. 202110890392.3 entitled "Ventilation and Air Conditioning Arrangement and Recreational Vehicle With a Ventilation and Air Conditioning Arrangement" filed on Aug. 4, 2021.
DE Patent Application No. 102021208289 entitled "Ventilating Unit and Recreational Vehicle with a Ventilation Unit" filed on Jul. 30, 2021.
Office Action Issued in DE Patent Application No. 102020206181.5 mailed on Apr. 16, 2021.
Office Action Issued in DE Patent Application No. 102020206183.1 mailed on May 7, 2021.

(56) References Cited

OTHER PUBLICATIONS

Office Action Issued in DE Patent Application No. 102020206182.3 mailed on May 21, 2021.
EU Application No. 008654396-0001-0006 titled "Lighting and Mobile Air Conditioning Systems with illumination" filed on Aug. 16, 2021.
EU Application No. 008654404-0001-0004 titled "Inventilate—Heat Exchanger" filed on Aug. 16, 2021.
International Search Report and Written Opinion Issued for Application No. PCT/EP2021/061568 mailed on Aug. 10, 2021.
International Search Report and Written Opinion Issued for Application No. PCT/EP2021/061678 mailed on Aug. 11, 2021.
International Search Report and Written Opinion Issued for Application No. PCT/EP2021/061578 mailed on Aug. 20, 2021.
Australia Application No. 202210863 titled "Air Conditioner" filed on Feb. 16, 2022.
Australia Application No. 202210864 titled "Air Conditioner" filed on Feb. 16, 2022.
Australia Application No. 202210865 titled "Air Conditioner" filed on Feb. 16, 2022.
Australia Application No. 202210874 titled "Air Conditioner" filed on Feb. 16, 2022.
Australia Application No. 202210875 titled "Air Conditioner" filed on Feb. 16, 2022.
Australia Application No. 202210876 titled "Air Conditioner" filed on Feb. 16, 2022.
Australia Application No. 202210877 titled "Air Conditioner" filed on Feb. 16, 2022.
Australia Application No. 202210878 titled "Air Conditioner" filed on Feb. 16, 2022.
Australia Application No. 202210879 titled "Air Conditioner" filed on Feb. 16, 2022.
China Application No. 202230072949.8 titled "Rooftop heat exchanger" filed on Feb. 15, 2022.
China Application No. 202230072879.6 titled "Rooftop heat exchanger" filed on Feb. 15, 2022.
China Application No. 202230072942.6 titled "The cover of the heat exchanger" filed on Feb. 15, 2022.
China Application No. 202230073233.X titled "Rooftop heat exchanger" filed on Feb. 15, 2022.
China Application No. 202230073231 titled "Rooftop heat exchanger" filed on Feb. 15, 2022.
China Application No. 202230073218.5 titled "Rooftop heat exchanger" filed on Feb. 15, 2022.
China Application No. 202230073134.1 titled "Rooftop heat exchanger" filed on Feb. 15, 2022.
European Union Application No. 008654404-0001-0004 titled "Rooftop heat exchanger" filed on Aug. 16, 2021.
European Union Application No. 008654396-0001-0006 titled "Shape" filed on Aug. 16, 2021.
Office Action Issued in European Patent Application No. 19759430.2 mailed on Jan. 28, 2022.
Office Action Issued in German Application No. 102021208289 mailed on Feb. 8, 2022.
U.S. Appl. No. 29/826,755 titled "Housing" filed Feb. 15, 2022.
U.S. Appl. No. 29/826,757 titled "Housing" filed Feb. 15, 2022.
United Kingdom Application No. 6191825 titled "Ventilation and air conditioning equipment" filed on Feb. 15, 2022.
United Kingdom Application No. 6191826 titled "Ventilation and air conditioning equipment" filed on Feb. 15, 2022.
United Kingdom Application No. 6191827 titled "Ventilation and air conditioning equipment" filed on Feb. 15, 2022.
United Kingdom Application No. 6191828 titled "Ventilation and air conditioning equipment" filed on Feb. 15, 2022.
United Kingdom Application No. 6191837 titled "Ventilation and air conditioning equipment" filed on Feb. 15, 2022.
United Kingdom Application No. 6191838 titled "Ventilation and air conditioning equipment" filed on Feb. 15, 2022.
United Kingdom Application No. 6191839 titled "Ventilation and air conditioning equipment" filed on Feb. 15, 2022.
United Kingdom Application No. 6191840 titled "Ventilation and air conditioning equipment" filed on Feb. 15, 2022.
United Kingdom Application No. 6191841 titled "Ventilation and air conditioning equipment" filed on Feb. 15, 2022.
United Kingdom Application No. 6191842 titled "Ventilation and air conditioning equipment" filed on Feb. 15, 2022.
Design U.S. Appl. No. 29/645,887, filed Apr. 30, 2018 titled Mobile Air Conditioner.
Design U.S. Appl. No. 29/660,094, filed Aug. 17, 2018 titled Air Distribution Box.
U.S. Appl. No. 17/342,723, filed Jun. 9, 2021 titled Vehicle Air Conditioner.
Notice to Grant Issued in Chinese Application No. 202230073134.1 mailed on Apr. 12, 2022.
Office Action Issued in German Application No. 102021208289 mailed on Jun. 2, 2022.
Notice to Grant Issued in Chinese Application No. 202230072942.6 mailed on Dec. 19, 2023.
Office Action issued in DE Application No. 102021208289.0 mailed on Dec. 22, 2023.
Intention to Grant issued in EP Application No. 19759430.2 mailed on Jan. 5, 2024.
Notice to Grant issued in CN Application No. 202230072879.6 mailed on Jan. 3, 2024.
"Dometic FreshJet 3 Series 15K" Internet URL: https://www.dometic.com/en-us/outdoor/rv-and-van/rv-air-conditioners/dometic-freshjet-3-series-15k-263393, Year:2024.
"Dometic 9600028600 FreshJet 3 Series Standard Profile Mechanical Rooftop Air Conditioner, Cool Only—15,000 BTU, White", Internet URL: https://www.amazon.com/gp/aw/d/B0BGYXRMFM/?th=1, Year: 2024.
"RecPro RV Air Conditioner 13.5K Non-Ducted | Quiet AC | 110-120V | Cooling Only | Easy Install | All-in-One Unit | For Camper, Travel Trailer, Fifth Wheel, Food Trucks, Motor Home (White)", Internet URL: https://www.amazon.com/RecPro-Conditioner-110-120V-Non-Ducted-Installation/dp/B0B22WCYKR/?th=1, Year: 2024.
Restriction Requirement issued in U.S. Appl. No. 29/826,757 mailed on Jan. 19, 2024.
AU Patent Application No. 2022317094 titled "Ventilation unit and recreational vehicle with a ventilation unit" filed on Jan. 23, 2024.
EP Patent Application No. 22734620.2 titled "Ventilation unit and recreational vehicle with a ventilation unit" filed on Feb. 6, 2024.
PCT Application No. PCT/EP2024/051551 titled "Ventilation unit and recreational vehicle with a ventilation unit" filed on Jan. 23, 2024.
U.S. Appl. No. 18/293,054 titled "Ventilation unit and recreational vehicle with a ventilation unit" filed Jan. 29, 2024.
Office Action Issued in DE Application No. 102023200650.2 mailed on Sep. 25, 2023.
Ex-Parte Quayle Action issued in U.S. Appl. No. 29/826,755 mailed on Oct. 10, 2023.
German Patent Application No. 112021000525.1 titled "Heating, Ventilation and Air Conditioning System with Illumination" filed on Sep. 12, 2022.
AU Patent Application No. 2021239071 titled "Heating, Ventilation and Air Conditioning System with Illumination" filed on Jul. 6, 2022.
Office Action issued in German Patent Application No. 112021000525.1 mailed on Oct. 25, 2023.
U.S. Appl. No. 29/915,796 titled "Housing Edge For Air Conditioning Apparatus " filed Nov. 3, 2023.
U.S. Appl. No. 29/915,798 titled "Housing Portion For Air Conditioning Apparatus" filed Nov. 3, 2023.
U.S. Appl. No. 29/915,799 titled "Housing For Air Conditioning Apparatus" filed Nov. 3, 2023.
Non-Final issued in U.S. Appl. No. 17/205,719 mailed on Nov. 30, 2023.
CN Patent Application No. 202280053379.5 titled "Ventilation unit and recreational vehicle with a ventilation unit" filed on Jan. 30, 2024.
Decision to Grant issued in EP Application No. 19759430.2 mailed on Mar. 14, 2024.

(56) References Cited

OTHER PUBLICATIONS

Installation Manual—Brisk II (B57915, B59516, B79516), High Performance (540315, 540316), Blizzard NXT (H540315, H540316), FreshJet (FJX3473, FJX3573), Available Online at:https://www.dometic.com/en-us/outdoor/rv-and-van/rv-air-conditioners, Published Oct. 31, 2023.
Non-Final Office Action issued in U.S. Appl. No. 29/915,796 mailed on Dec. 19, 2023.
Notice of Allowance issued in U.S. Appl. No. 29/915,798 mailed on Jan. 4, 2024.
Office Action Issued in DE Application No. 102020206182.3 mailed on Dec. 7, 2023.
Office Action issued in CN Application No. 202230073233.X mailed on Dec. 7, 2023.
Office Action issued in CN Application No. 202230073218.5 mailed on Dec. 7, 2023.
Office Action issued in DE Application No. 102020206183.1 mailed on Dec. 7, 2023.
European Patent Office, International Search Report and Written Opinion for PCT/IB2019/055060 dated Nov. 29, 2019, 10 pages.
Amazon, Evapolar Personal Air Cooler & Humidifier, Jan. 12, 2017 (retrieved from internet Sep. 27, 2017).
Kickstarter, Zero Breeze World's Coolest Portable Air Conditioner, Sep. 27, 2017.
Negative Ion Generators, UV Purification Light; Ultraviolet Air Probe Sanitizer, Feb. 3, 2017 (retrieved from internet Sep. 27, 2017).
Notice of Allowance issued in U.S. Appl. No. 29/826,755 mailed on Apr. 15, 2024.
Final Office Action issued in U.S. Appl. No. 17/205,719 mailed on Jun. 28, 2024.
Notification to Grant for Chinese Patent Application No. 202230073233.X mailed on Apr. 23, 2024.
Examination Report issued in AU Application No. 2019291452 mailed on Apr. 26, 2024.
International Search Report and Written Opinion issued in PCT Application No. PCT/EP2024/051551 mailed on May 2, 2024.
Notification to Grant for Chinese Patent Application No. 202230073218.5 mailed on May 11, 2024.
Notification to Grant for Chinese Patent Application No. 201980040452.3 mailed on May 1, 2024.
Notice of Allowance issued in Design U.S. Appl. No. 29/915,796 mailed on Jul. 15, 2024.
Notice of Allowance issued in Design U.S. Appl. No. 29/915,798 mailed on Jul. 17, 2024.

* cited by examiner

HEATING, VENTILATION AND AIR CONDITIONING SYSTEM WITH ILLUMINATION

CLAIM TO PRIORITY

This 35 U.S.C. § 371 National Stage patent application claims priority to PCT Patent Application No. PCT/IB2019/055060, filed Jun. 17, 2019, and titled "Heating, Ventilation and Air Conditioning System with Illumination" which claims priority to and benefit of U.S. Provisional Patent Application Ser. No. 62/686,217 filed Jun. 18, 2018, all of which is incorporated by reference herein.

BACKGROUND

The present embodiments relate to heating, ventilation, and air conditioning ("HVAC") systems for recreational vehicles, marine vehicles and fixed structures utilizing same. More specifically, present embodiments relate to, HVAC systems having illumination which emits from the housing of the HVAC mechanicals.

HVAC systems are typically provided on motorized vehicles such as trucks, busses, motor homes, etc. and vessels such as boats, ships, etc. (hereinafter and in the scope of the present embodiments collectively referred to as "mobile units"). These devices may also be used on fixed structures as well. The HVAC devices provide conditioned air to the interior of the mobile or fixed structure to which the HVAC is mounted. During operation of the mobile unit the HVAC system is powered by the energy produced by the mobile unit's engine(s), a 12v DC source, or electricity provided for example at a camping site, often referred to as shore power.

When on camping trips, for example, there may be a desire to illuminate the area surrounding the recreational vehicle or alternatively a bus for example while stopped for rest. In part this may be for reasons of illuminating an area, or alternatively may be purely for aesthetics.

In many installations, the HVAC is one of, if not the, highest installed part of the vehicle, and would provide for a good location to provide a light source. Additionally, it would be desirable to provide a light of desired color or other functionality which is aesthetically pleasing.

SUMMARY

The present embodiments relate to a HVAC system which is used in both fixed and mobile structures, and which has a luminaire disposed in the HVAC to provide illumination therefrom. The luminaire may be a single continuously on light or it may be a flashing light with one or more patterns. The light may emit a single color or multiple colors. The light may also have a flashing sequence which corresponds to audio. The light may be wired to a switch and/or may be controlled by a smart device in wireless communication with the HVAC system.

According to some embodiments, a mobile air conditioner with illumination comprises a base pan, an air shroud engaging the base pan, and a plurality of ventilation holes in at least one of the base pan or the air shroud. A luminaire may be disposed within one of the base pan or the air shroud, the luminaire emitting light through at least some of the plurality of ventilation holes.

According to some optional embodiments, the following may be utilized alone with the mobile air conditioner or in combination with one another and the mobile air conditioner. The luminaire may be at least one light emitting diode (LED) strip. The at least one LED strip may be a plurality of LEDs. The mobile air conditioner with illumination may further comprise a remotely located controller. The controller may be defined by an application on one of a smart device or a remote control. The controller may have a microphone for synchronizing illumination to sound. The luminaire may have an on/off function. The luminaire may have sequenced illumination function. The luminaire may be adjustable to emit one or more preselected colors. The luminaire may be adjustable to inhibit illumination of one or more preselected colors. The mobile air conditioner with illumination may further comprise a plurality of mechanicals including an evaporator, a condenser, a fan, and a compressor. The base pan and the air shroud may define a single housing structure. The base pan and the air shroud may be distinct structures. The mobile air conditioner with illumination wherein the luminaire is snap fit to one of the base pan, the air shroud, or an internal frame. The base pan and said air shroud are defined by a one-piece structure. The luminaire may be disposed on a strip that is affixed by one of a snap-fit, a glue, a cement, a tape, a fixative or a fastener.

According to some embodiments, a method of providing illumination on a recreational vehicle, comprises controlling a mobile air conditioner function, controlling a luminaire, the luminaire disposed in the mobile air conditioner and capable of emitting light therefrom, controlling a luminaire further comprising at least one of color, speed, or power of the lights.

According to some optional embodiments, the following may be used with the method either individually or in combination with one another. The controlling a luminaire may be controlled by a remote control. The remote control may be a smart phone or a smart pad. The method may further comprise using a microphone to synchronize the luminaire to sound. The method may further comprise controlling the luminaire with a wired switch. All of the above outlined features are to be understood as exemplary only and many more features and objectives of a HVAC system with illumination may be gleaned from the disclosure herein. Therefore, no limiting interpretation of this summary is to be understood without further reading of the entire specification, claims and drawings, included herewith. Additional benefits and advantages of the present embodiments will become apparent to those skilled in the art to which it pertains upon a reading and understanding of the following detailed specification.

BRIEF DESCRIPTION OF THE DRAWINGS

In order that the embodiments may be better understood, embodiments of the HVAC system with illumination will now be described by way of examples. These embodiments are not to limit the scope of the claims as other embodiments of the HVAC system with illumination will become apparent to one having ordinary skill in the art upon reading the instant description. Non-limiting examples of the present embodiments are shown in figures, wherein:

Figure 1:
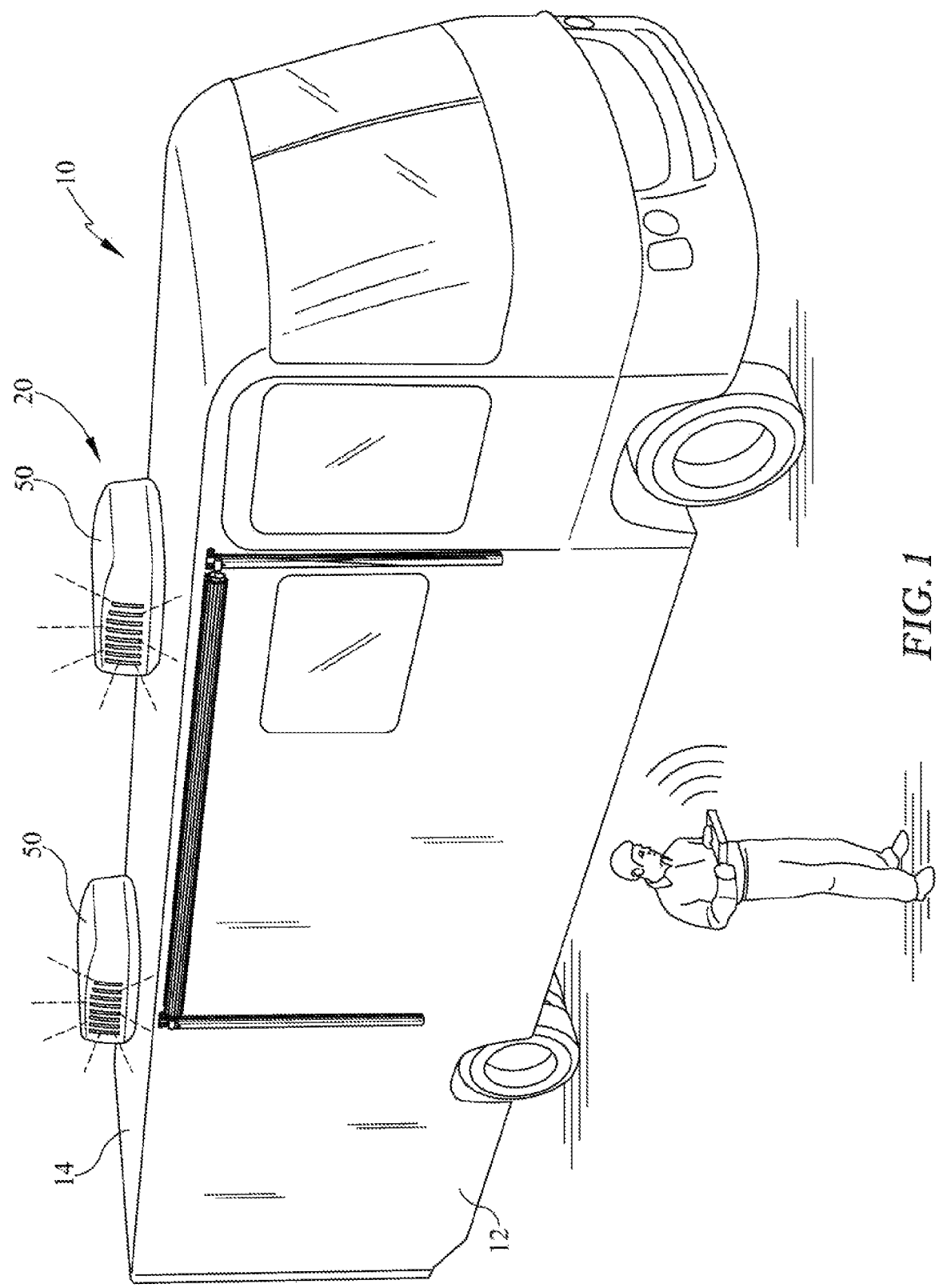
FIG. 1 is a perspective view of an illustrative, non-limiting recreational vehicle which may utilize a HVAC according to various embodiments.

It is to be understood that the HVAC system with illumination is not limited in its application to the details of construction and the arrangement of components set forth in the following description or illustrated in the drawings. The embodiments are capable of other variations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Referring now in detail to the drawings, wherein like numerals indicate like elements throughout several views, there are shown in FIGS. 1 through 8 various embodiments of a mobile air conditioner ("A/C") with illumination which may provide illumination from vent holes in the A/C housing. According to illustrative embodiments, an HVAC system is adapted for use on mobile or fixed structures. The term "mobile unit" as used herein includes vehicles having engines such as trucks, busses, motor homes, motorized or non-motorized recreational vehicles etc. and vessels having engines such as boats, ships, etc., but should also be understood to be inclusive of uses on fixed structures. The term "HVAC system" as used herein refers generally to an environmental-control unit for controlling an environment, which includes heating, cooling, ventilating, air handling, humidifying, dehumidifying, etc. in a controlled environmental space within the mobile unit. The controlled environmental space may include an operating portion, where an operator resides when the mobile unit is operational, and a sleeping portion where the operator rests when the mobile unit is not operational. The HVAC system is also suitable for use in a fixed structure, such as for non-limiting example, a small building.

Referring now to FIG. 1, a perspective view of a mobile unit, such as for non-limiting example a recreational vehicle 10 is depicted. As used herein, the term "recreational vehicle" (RV) refers to mobile homes, motor homes, travel trailers, fifth wheels, recreational vans and the like. A recreational vehicle may be one type of mobile unit. It should also be understood by one skilled in the art that the instant embodiment may be utilized with stationary structures having roof-mounted air conditioning units and air conditioning ducts extending through the ceiling area of the structure. Likewise, the embodiments of the instant disclosure are also suitable for use in various water crafts having exterior air conditioning units and duct work passing through cavities or spaces between the roof and ceiling. The depicted RV 10 includes a drive and transmission, not shown, as well as a sidewall 12 and a roof 14. Alternatively however, the RV may be in the form of a non-powered, pull-behind camper, non-mobile structures, and watercraft.

On the roof 14 of the RV 10, a portion of the air conditioning system 20 is depicted. An air conditioning unit 50 is positioned along the roof line in at least one position. According to the instant embodiment, two air conditioning units 50 are utilized in two separate locations to provide conditioned air to the interior of the RV 10. The interior may be a single zone or may be broken up into various zones.

An air conditioning system 20 includes an air conditioning unit 50 disposed on the roof 14 and may, or may not, include ducting below the roof 14 but above the ceiling below to provide conditioned air to the interior of the vehicle 10. In embodiments where ducting is not utilized, the system may also include an air distribution box (not shown) beneath the A/C unit 50 within the interior of the RV. The air conditioning unit 50 may be mounted in a variety of fashions, including but not limited to, fasteners passing through the roof 14, for example to or through structural members or through a template therein or combinations, for non-limiting example.

The air conditioning units 50 will be known to one skilled in the art and may include various models including, but not limited to, any of the Dometic Brisk, Brisk II, Penguin, Penguin II, or Blizzard NXT examples of air conditioning units, available from Dometic Corporation having headquarters in Louisville, Ky. Further, while two air conditioning units 50 are shown, it is well within the scope of the present disclosure that a single air conditioning unit may be utilized or more than two units be utilized. Such number will be a design characteristic based on the load capability of the air conditioning unit and the volume of the vehicle 10 being cooled.

Also shown in the FIG. 1, is a person who may be using the illumination feature of the A/C units 50. The A/C units 50 desirably emit light of one or more colors from apertures in the units 50. The emission of lights may provide a desirable aesthetic appearance. The person is shown with a smart device, which may take various forms including but not limited to smart phone, smart pad, smart watch, mobile computer or other device capable of running an application (or "app") which may store control logic for operation of the A/C unit and/or lights.

Figure 2:
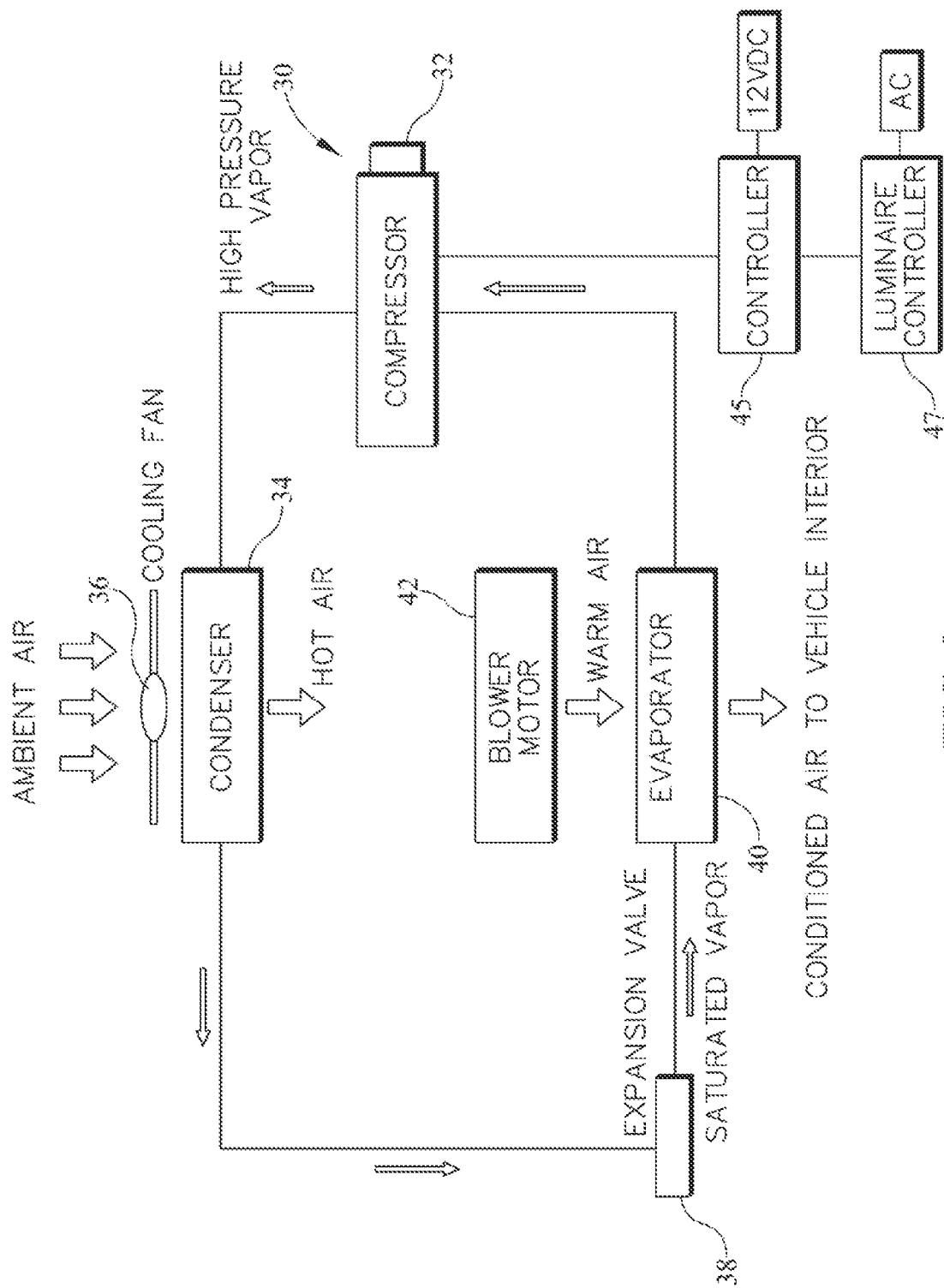
FIG. 2 is a schematic view of a number of components defining an HVAC.

Referring now to FIG. 2, a schematic view of HVAC components is depicted. Starting at the right-hand side of the drawing, a compressor 30 is depicted. The compressor 30 may be connected to a motor 32 which drives the rotation or movement of the compressor 30 in order to compress a refrigerant. The compressor 30 may be a single speed, multi-speed, or variable speed compressor. The compressor 30 forces the compressed refrigerant upward along the schematic view toward a condenser 34. The condenser 34 may also comprise a cooling fan 36 which blows ambient air across a plurality of fins and/or coils which are in fluid communication with the refrigerant. The cooling fan 36 moves air across these fins and/or coils of the condenser 34 in order to reduce the temperature of the refrigerant which then moves to the left in the illustrative schematic view. The refrigerant continues toward an expansion valve 38 which reduces the pressure of the refrigerant and then further on to an evaporator 40. A fan 42 may also blow air from an interior of the RV or other enclosed volume across the fins and/or coils of the evaporator 40. At this time, the refrigerant is of a lower pressure and temperature such that the air blowing across it is cooled and returns into the enclosed space of the RV as a conditioned, cooled air which is comforting to the users and of decreased humidity.

After moving through the evaporator 40, the refrigerant returns to the compressor 30. At some position along the flow path of the refrigerant, a tank or other volume may provide a reservoir for the refrigerant, according to some embodiments. This option merely is illustrative and very general of the operation of an air conditioner which may be utilized in any of the embodiments described. Further, variations of the described components of the system may also be implemented and be within the scope of the instant embodiments.

Figure 3:
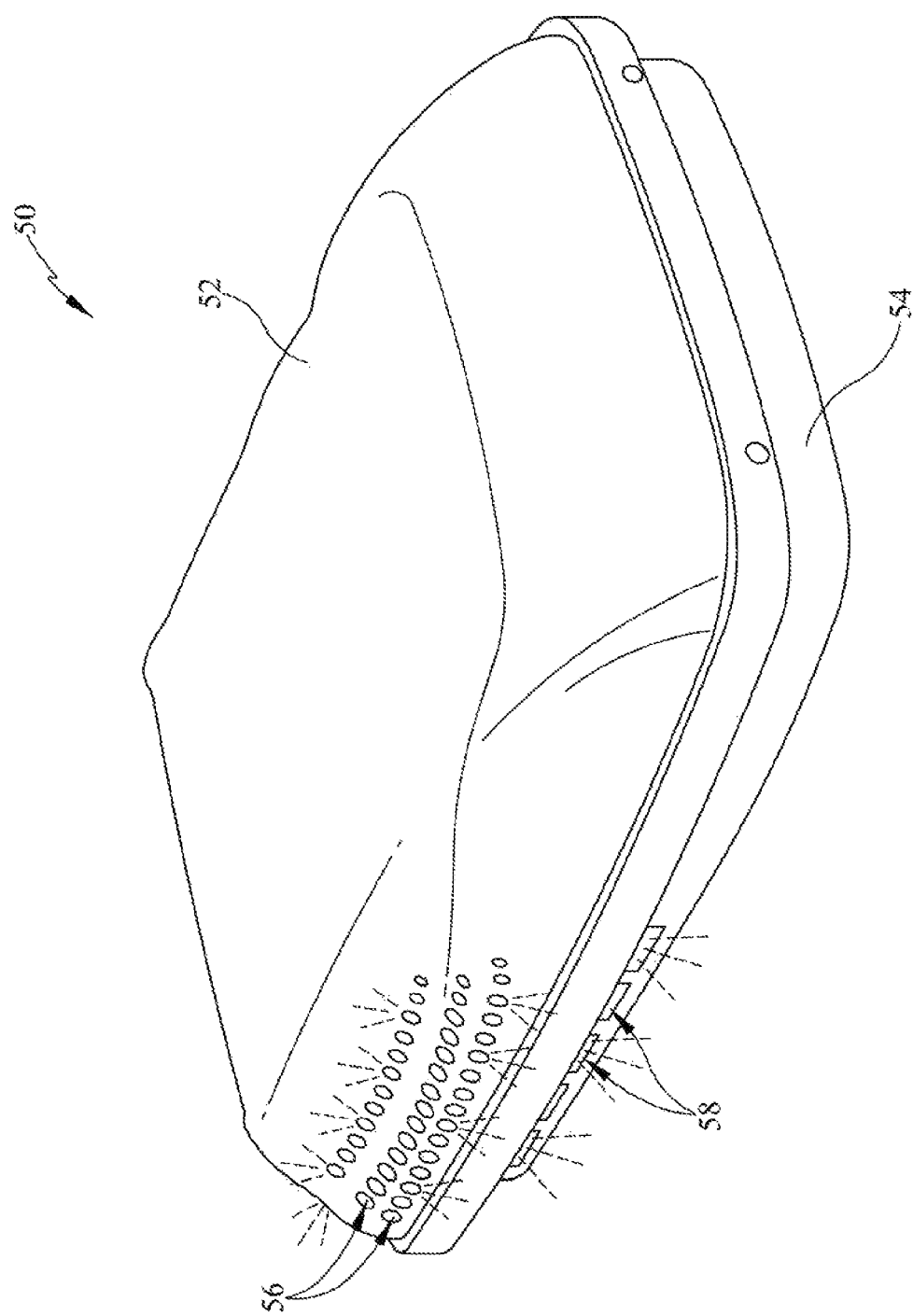
FIG. 3 is an exemplary perspective view of an illustrative HVAC with illumination.

Referring now to FIG. 3, a perspective view of an illustrative HVAC unit 50 with illumination is depicted. The depicted mobile air conditioner ("AC") 50 may be defined by an air shroud 52 and a base pan 54 collectively to define a housing. The air shroud 52 and the base pan 54 may be formed as a single part or may be formed as two parts which may be disconnected from one another. The removability of the air shroud 52 from the base pan 54 may allow for access of the interior of the air conditioner 50 wherein a plurality of mechanical components such as those described in FIG. 2 may be located. The mobile A/C unit 50 may also comprise a plurality of vent holes 56 in the air shroud 52 and/or vent holes 58 in the base pan 54. The vent holes 56, 58 may be utilized for air flow to or from the condenser 34 (FIG. 2) and also may allow illumination outwardly from inside the mobile A/C unit 50.

The mobile A/C unit 50 may be mounted on a roof top of a mobile structure such as an RV, truck, trailer, mobile home, or alternatively may be mounted on a fixed structure for use in cooling such. In some embodiments, the mobile A/C units may be mounted on other surfaces such as a front or rear surface of the mobile unit or RV, which may be a horizontal, vertical, or in between these surface orientations. Further, the mobile A/C unit 50 may be utilized with ducted or non-ducted cooling configurations within the mobile or fixed structure to which the mobile A/C unit 50 is connected.

Figure 4:
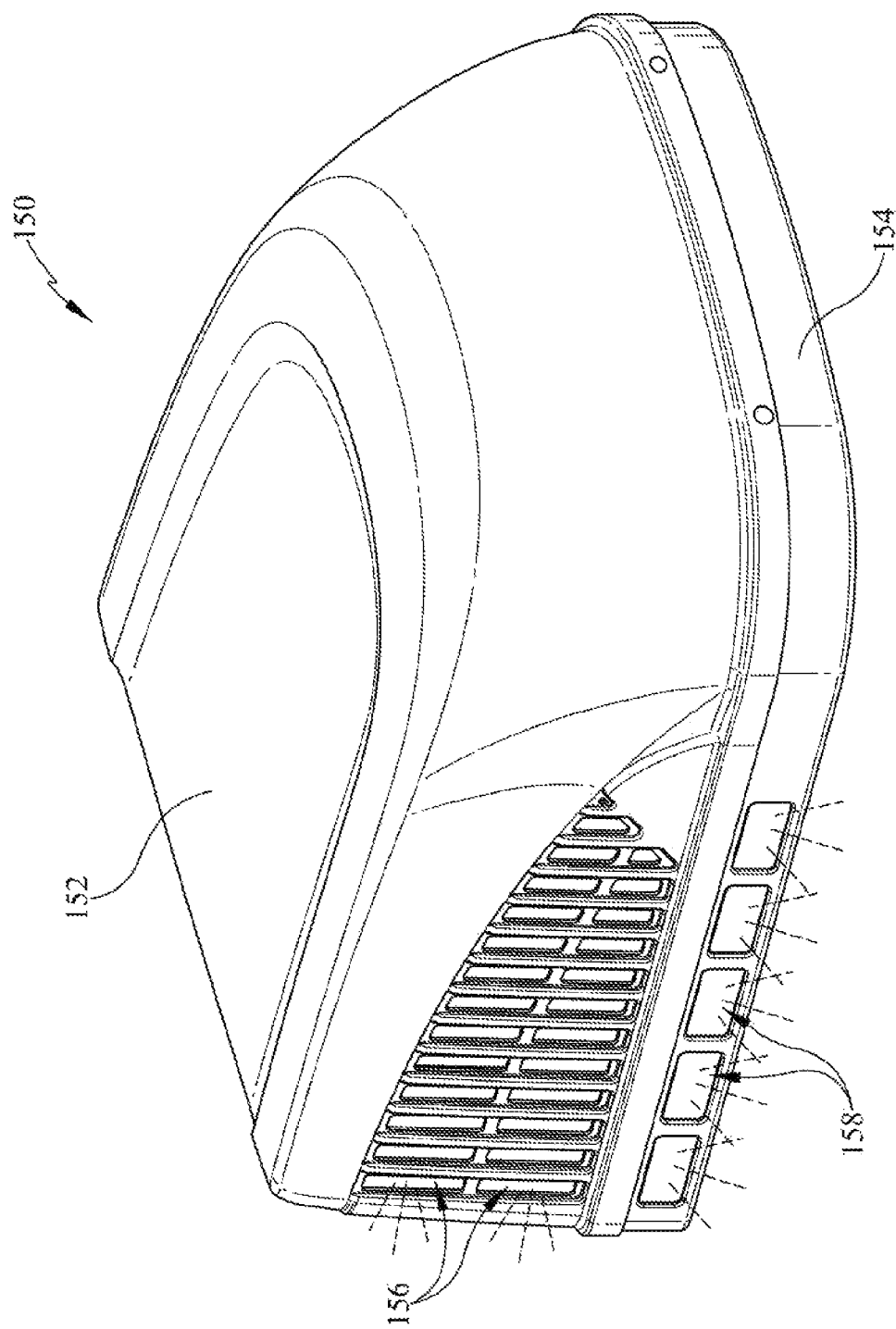
FIG. 4 is an exemplary perspective view of an alternate HVAC with illumination.

Referring now to FIG. 4, a perspective view of an alternative HVAC with illumination is depicted. The mobile A/C unit 150 is of a differing shape, primarily differing in that the embodiment of FIG. 3 was a low-profile design which has improved aerodynamic efficiencies. The embodiment of FIG. 4 may provide a larger system which provides similar characteristics in a larger size where aerodynamics may not be as important to an installer or user.

The mobile A/C unit 150 comprises an air shroud 152 and a base pan 154. The air shroud 152 and base pan 154 may be formed separately of two structures, however in some embodiments, may be formed as a single structure. The air shroud 152 may include a plurality of vent holes 156 and the base pan 154 may include a plurality of vent holes 158. As with the previous embodiment, the vent holes 156, 158 may be utilized to allow air flow to or from the condenser 34 (FIG. 2) and also illumination outwardly from inside the mobile A/C unit 150.

Figure 5:
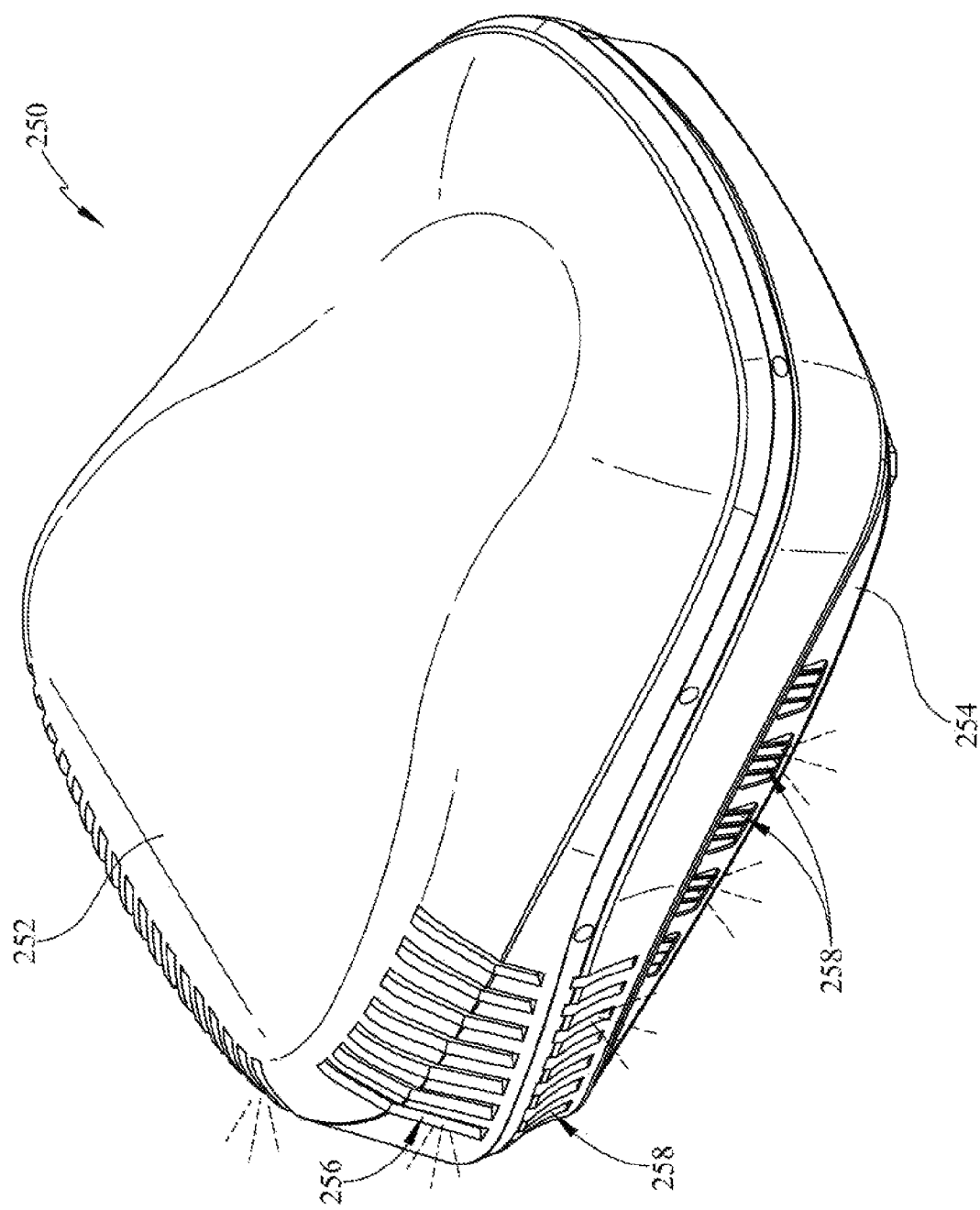
FIG. 5 is an exemplary perspective view of an alternative HVAC with illumination.

Referring now to FIG. 5, a further embodiment of a mobile A/C unit 250 is provided. The mobile A/C unit 250 provides still further that various shapes and designs may be utilized. The air shroud 252, again may provide a plurality of vent holes 256 while the base pan 254 may be provided with a plurality of vent holes 258. These vent holes 256, 258 may allow for air flow to or from the condenser 34 (FIG. 2) and also may allow for illumination to be emitted from the mobile A/C unit 250.

Figure 6:
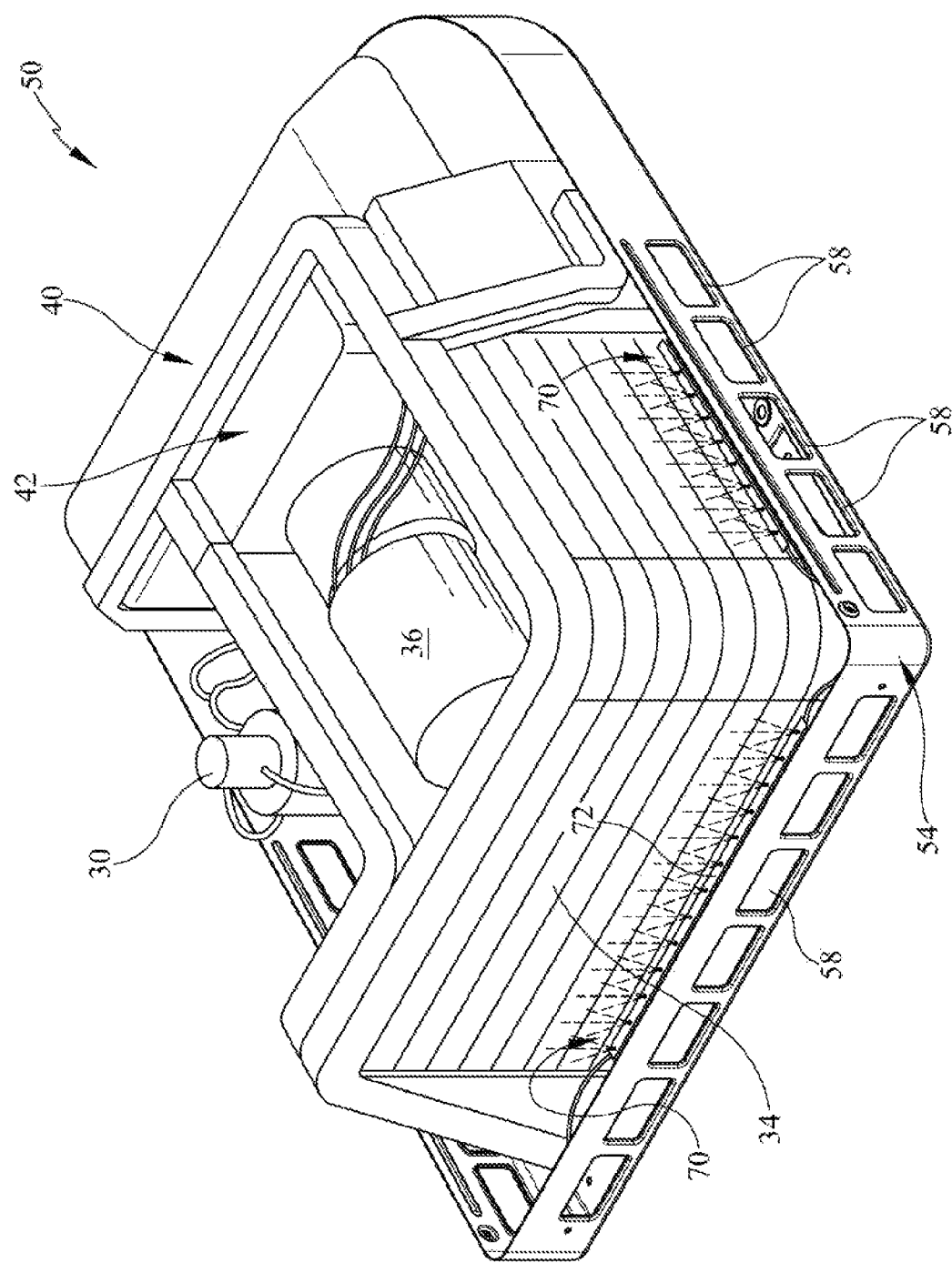
FIG. 6 is a perspective view of an HVAC of FIG. 3 with the air shroud removed to reveal the interior of the HVAC and the luminaires.

Referring now to FIG. 6, a perspective view of the illustrative A/C unit 50 with the air shroud 52 removed. The A/C unit 50 includes a base pan 54 having a plurality of vent holes 58, located around the lower perimeter thereof. The base pan vent holes 58 allow for air movement either toward and/or away from the condenser 34. As previously described, this air flow brings in ambient air and cools the compressed refrigerant passing through the condenser 34, as part of the cooling process. Also shown within the base pan 54 are the fan 42 and the evaporator 40, which are hidden by foam structures which reduce sound related noise and vibration associated with operation of those components. Additionally, the compressor 30 may be seen, including coils which extend toward the condenser 34 and from the evaporator 40 to the compressor 30. A fan housing for cooling fan 36 is also shown, wherein the fan 36 may pull air either into the system through the vent holes 58 or blow air from the system out across the condenser 34, through the vent holes 58.

Also shown in the embodiment is a luminaire 70 which may be embodied in some forms as at least one LED light strip 72. The LED light strip 72 may be located in various positions of the A/C unit 50, or any of the units described herein. In the exemplary embodiment, the luminaire 70 is defined by three LED light strips 72 which are positioned along the boundaries of the base pan 54. In the instant embodiment, the light strips 72 are located along the two lateral edges and the rear edge of the base pan 54, within the base pan 54 and adjacent to vent holes 58. The luminaries 70 emit light from the base pan 54 through the vent holes 58 due to their location. Further, the luminaires 70 may also reflect light from the fins and/or coils defining the condenser 34 so that a wall of soft light is defined which will also emit through the vent holes 58 of the base pan 54 and any holes in this area which are disposed on the air shroud 52 (FIG. 2). For example, in the instant embodiment, the air shroud 52 comprises vent holes 56 which would also emit light as the luminaires 70 would reflect from the condenser 34 through the vent holes 56.

The luminaires 70 may all be located in the same plane or may vary in different heights, relative to the base pan 54 depending from where vent holes 58 are located and/or vent holes 56 of the air shroud 52. Additionally, the instant embodiment depicts LED light strips 72 which are all horizontally positioned. However, other configurations are used, for example, where the light strips 72 are arranged in a vertical fashion.

The LED light strips 72 may be disposed in or on the base pan 54 in a variety of manners. Various structures or features may be utilized to affix the light strips 72 including, but not limited to, glue, cement, tape, fixatives, fasteners, or snap fit structures, all of which are non-limiting examples. It may be desirable to use a locking structure, such as a snap fit, according to some embodiments, since it would be highly undesirable for the light strips 72 to come loose during operation of the fan 42 or during movement of the mobile unit.

Figure 7:
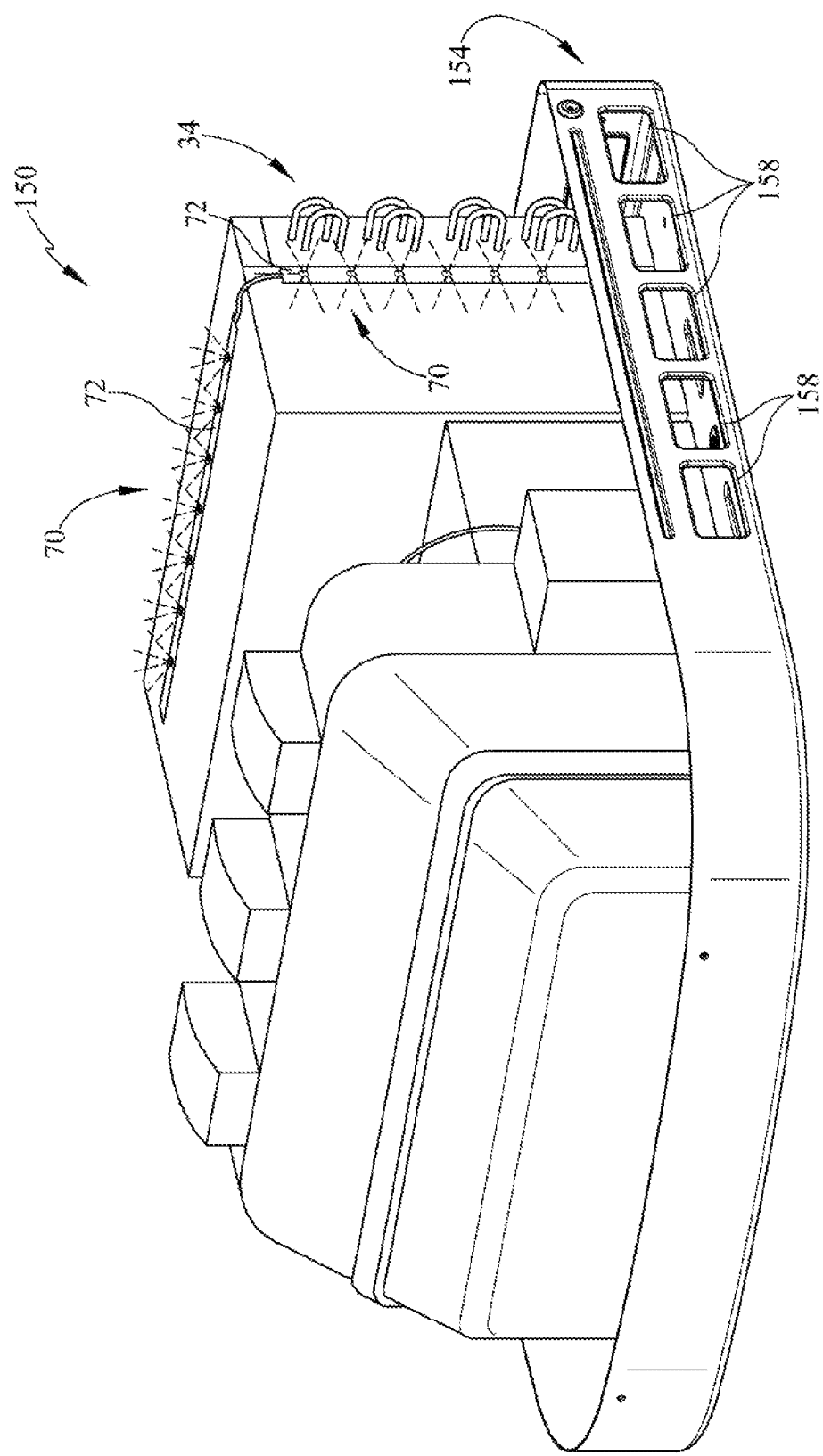
FIG. 7 is a perspective view of an alternate HVAC system.

Referring now to FIG. 7, an alternate embodiment is depicted which shows a base pan 154 of the mobile A/C unit 150. The air shroud 152 (FIG. 4) is removed for viewing of the internal structures. In this view, a foam structure is disposed over the evaporator 40 and portion of the fan 42 associated therewith. Toward the rear of the mobile A/C unit 150, a plurality of coils are shown associated with the condenser 34. The base pan 154 also includes a plurality of vent holes 158 through which air may be pulled to either pass to the condenser 34 or exit from the condenser and out of the interior of the A/C unit 150.

Additionally, in this embodiment, a plurality of luminaires 70 are provided and again defined by LED light strips 72. At least one of the LED light strips 72 is oriented in a vertical fashion along the side of an internal component of the A/C unit 150. This may be desirable where an air shroud 152 (FIG. 4) is tall and light is desired along the height of the structure. Additionally, in this embodiment, the LED light strip 72 is also located along an upper edge of a component for shining through either apertures in the top surface of the air shroud or holes which may extend from side surfaces to an upper surface thereof. Thus, the LED light strips 72 should be understood as capable of being mounted in a variety of locations and in a variety of configurations within the A/C units.

According to some embodiments, the LEDs are powered by 12V which allows operation from the 12V RV system or alternatively may be operated by alternating current (AC) shore power which may be converted to DC. Likewise, generators or power inverters may be utilized to power the A/C unit 50, 150, 250 and thereby power the luminaires 70.

Still further, the controller associated with the LED lighting may be onboard a controller 45 for the AC mechanical components or may be within the mobile A/C unit 50 but in a separate housing therein. The luminaire controller 47 for the LEDs may be a Bluetooth controller or may be wi-fi connected, or have other wireless connection technology. The wireless communication will allow for the use of a remote control or smart device to control the lighting operation and desired effect, in addition to, or alternatively from, a wired light switch that may also be used. The luminaire controller may control some number of LED strips.

Further according to some embodiments, it is possible that the luminaire controller may also be used to control other LEDs on the RV, such as for non-limiting example, LEDs on an awning assembly.

Various effects may be provided by the controller and controlled in the manners or by the devices described. In some embodiments, the luminaire 70 may be have any or all or combinations of the following functions. The luminaire 70 may be controlled in order to provide one or more colors. The luminaire 70 may also be a continuously on light or may be flashing in any of a plurality of sequences, with one color or multiple colors during the sequence. The sequences may be pre-programmed, may be random, or may be based upon other factors, for example an audio signal. For example, when music plays in the background, it may be desirable to use a microphone on the remote control or a smart device in order to capture an audio signal and provide light flashing in approximately synchronized manner to the music signal captured by the microphone. This may be done by "listening" for a specific frequency range, for example a lower, bassline frequency range, to which the flashing lights may be synchronized.

Further still, the luminaire controller may also have a motion sensor. In many jurisdictions, flashing lights on a vehicle may not be allowed, or may be limited in color, due the use of flashing lights of first responder vehicles. Thus, flashing lights may only be used, in some embodiments, when the vehicle is not moving. Accordingly, a motion sensor may be provided, for non-limiting example, in the luminaire controller which inhibits use of the flashing lights when the vehicle is in motion. Alternatively, the remote or a smart device may be used to provide the motion sensing and in communication with the luminaire controller, may provide the motion sensing, then communicate to the luminaire controller. Accordingly, the usable colors may be limited if a flashing sequence is selected and/or if the vehicle is moving.

Figure 8:
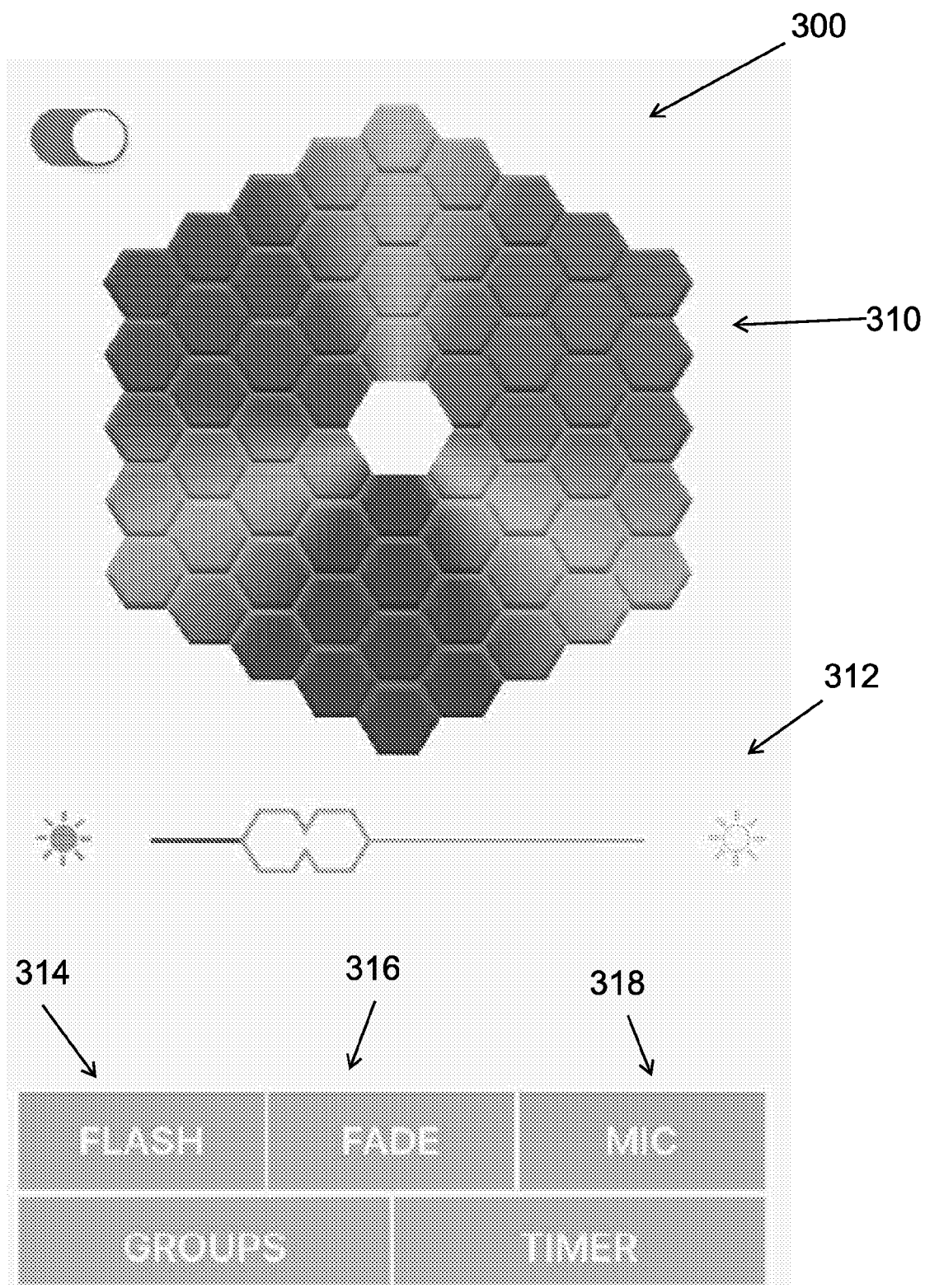
FIG. 8 is an illustrative selection screen from a remote or app of a smart device with various user selections for operation of the device.

In still further embodiments, the remote or smart device may provide an app wherein the color or colors may be selected by a user. The instant embodiments may provide that the app provides a color palette, for example on a touch screen. With reference to FIG. 8, a screenshot 300 is provided for a remote or smart device having an application ("app.") allowing the user to make selections for use of the illumination portion of the HVAC functionality. In the depicted figure, the smart device has a touchscreen with a color palette 310 so that various colors of a color spectrum including red, orange, yellow, green, blue, indigo and violet are provided, for example. Additionally, a slider or other control structure 312 for increasing or decreasing the brightness of the one or more luminaires 70. Other controls may be provided alternatively or additionally.

Still further at the lower portion of the screenshot 300 are additional controls for the luminaires 70. For example, one control button 314 provides for flashing lights. Another control button 316 may provide for effect like fade. Yet another control 318 may start the microphone function, as previously described to synchronize lighting to music which may be playing. Other functions may also be provided by the remote or app of the smart device in order to provide additional functionality such as a timer or in order to group specific lights together.

Still further, it may be desirable in some embodiments to provide illumination around an air distribution box (ADB) in the RV at the ceiling level. The base pan may have apertures that allow light to shine through the base pan and downward to provide interior illumination around the ADB. The luminaire may provide illumination about the interface of the ceiling and the ADB, or may provide light through a window provided in the ADB.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment has been presented for purposes of illustration. It is not intended to be exhaustive or to limit the embodiments to the precise steps and/or forms disclosed, and obviously many modifications and variations are possible in light of the above teaching. It is intended that the scope of the embodiments and all equivalents be defined by the claims appended hereto.

LIST OF REFERENCE NUMERALS 10 recreational vehicle
12 sidewall
14 roof
20 air conditioning system
30 compressor
34 condenser
36 cooling fan
38 expansion valve
40 evaporator
42 fan
45 controller
47 luminaire controller
50 mobile A/C unit
52 air shroud
54 base pan
56 vent hole
58 vent hole
70 luminaire
72 LED light strip
150 mobile A/C unit
152 air shroud
154 base pan
156 vent hole
158 vent hole
250 mobile A/C unit
252 air shroud
254 base pan
256 vent hole
258 vent hole
300 screenshot
310 color palette
312 other control structure
314 control button
316 control button
318 control

The invention claimed is:

1. A mobile air conditioner with illumination, comprising:
a base pan configured to be positioned on an exterior of a vehicle,
an air shroud engaging said base pan;
a plurality of ventilation holes in at least one of said base pan or said air shroud;
a luminaire disposed within one of said base pan or said air shroud, said luminaire emitting light through at least some of said plurality of ventilation holes of one or both of the base pan or the air shroud to an exterior of the base pan or the air shroud.

2. The mobile air conditioner with illumination of claim 1, said luminaire being at least one light emitting diode (LED) strip.

3. The mobile air conditioner with illumination of claim 2, said at least one light emitting diode (LED) strip having a plurality of LEDs.

4. The mobile air conditioner with illumination of claim 1, further comprising a remotely located controller.

5. The mobile air conditioner with illumination of claim 4, said controller defined by an application on one of a smart device or a remote control.

6. The mobile air conditioner with illumination of claim 4, said controller having a microphone for synchronizing illumination to sound.

7. The mobile air conditioner with illumination of claim 1, said luminaire having on/off function.

8. The mobile air conditioner with illumination of claim 1, said luminaire having sequenced illumination function.

9. The mobile air conditioner with illumination of claim 1, said luminaire being adjustable to emit one or more preselected colors.

10. The mobile air conditioner with illumination of claim 1, said luminaire being adjustable to inhibit illumination of one or more preselected colors.

11. The mobile air conditioner with illumination of claim 1, further comprising a plurality of mechanical components including an evaporator, a condenser, a fan, and a compressor.

12. The mobile air conditioner with illumination of claim 1, wherein said base pan and said air shroud define a single housing structure.

13. The mobile air conditioner with illumination of claim 1, wherein said base pan and said air shroud are distinct structures.

14. The mobile air conditioner with illumination of claim 1, wherein said luminaire is snap fit to one of said base pan, said air shroud, or an internal frame.

15. The mobile air conditioner with illumination of claim 1, wherein said base pan and said air shroud are defined by a one-piece structure.

16. The mobile air conditioner with illumination of claim 1, said luminaire being disposed on a strip that is affixed by one of a snap-fit, a glue, a cement, a tape, a fixative or a fastener.

17. A method of providing illumination on a recreational vehicle, comprising:
controlling function of a mobile air conditioner configured to be positioned on an exterior of said recreational vehicle;
controlling a luminaire, said luminaire disposed in said mobile air conditioner and capable of emitting light from one or both of a base pan or an air shroud to an exterior of said mobile air conditioner;
said controlling said luminaire further comprising at least one of color, speed, or brightness of the luminaire.

18. The method of claim 17, said controlling said luminaire being controlled by a remote control.

19. The method of claim 18, said remote control being a smart phone or a smart pad.

20. The method of claim 17 further comprising using a microphone to synchronize said luminaire to sound.

21. The method of claim 17 further comprising a controlling said luminaire with a wired switch.

* * * * *